UNITED STATES PATENT OFFICE.

HANS A. FRASCH, OF NEW YORK, N. Y.

DYESTUFF.

1,308,060.      Specification of Letters Patent.      Patented July 1, 1919.

No Drawing.      Application filed January 23, 1917. Serial No. 143,981.

*To all whom it may concern:*

Be it known that I, HANS A. FRASCH, a citizen of the United States, residing at New York, in the county of New York and State of New York, have invented a certain new and useful Improvement in Dyestuffs, of which the following is a full, clear, and exact description.

The object of this invention is to produce from petroleum a substance which in itself is a dyestuff and from which other dyestuffs may be obtained.

It is well known that certain organic sulfoproducts which have the properties of dyestuffs may be obtained from petroleum and distillates thereof and more particularly from the acid refuse, known as sludge, which is the result of refining these distillates by means of sulfuric acid.

Some of the sulfonic acids, their salts, and azo and nitro products thereof as obtained from petroleum by well known methods, have the property of dying wool and silk a brown or yellow color, but compared with other direct dyestuffs, as for instance, those derived from coal tar, they are not as intense in color, and are considerably weaker in dyeing power and correspondingly of smaller economical value. This deficiency I find to be due to imperfect separation of the individual constituents from the complex mixture contained in the crude material from which the dyestuff has been obtained. By the present invention I effect the more complete separation of these complex sulfonic products, and recover therefrom a substance which I term "petracin", which is not only a dyestuff in itself, but forms a base from which various other valuable dyestuffs of diverse colors and properties may be obtained. By my invention two varieties of petracin may be obtained, which I designate petracin A and petracin B, of which more particularly the first forms the subject of this present case.

Briefly stated, and as hereinafter claimed, the invention is essentially as follows:—The petroleum constituents being the crude material from which the dyestuff may be obtained, such as those resulting from treating petroleum with an inorganic acid and more particularly the products derived from treatment of petroleum distillates with sulfuric acid, are exposed to the action of a compound containing oxygen and a halogen.

The invention may be practised in a great variety of ways. For example: I may employ as the reagent chlorin in presence of an alkali or alkaline earth; or chlorin monoxid, or its higher oxids, or any salts thereof, the oxychlorid, hypochlorite or chlorate of an alkali or of an alkaline earth. I may also use a halogen such as chlorin in combination with an oxidizing agent, as for example, nitric acid; or I may use nitromuriatic acid, and subsequently neutralize with an alkali or an alkaline earth. The chlorin may be replaced by bromin or its corresponding salts. Sodium hypochlorite, however, is the preferred reagent used in the process.

The invention may be applied to the crude mixture of sulfonic products, such as obtained by precipitation from so-called paraffin acid sludge by dilution with water and neutralization with alkali; or, I may use the crude dyestuff as it is obtained by lixiviation of sludge and treatment and separation of the lixiviated products by means of lime, sodium carbonate, and sodium chlorid. To amplify the explanation of the invention, I select the sulfoproducts obtained as last described which I add either directly or in solution in about the proportion of ten parts of the sulfoproducts to one hundred parts of a ten per cent. solution of sodium hypochlorite, these proportions varying with the composition or purity of the sulfoproducts, and the mixture is agitated until the soluble constituents are in solution. Any insoluble matter is removed by filtration or otherwise. The resulting solution is then heated until an insoluble product separates, and the application of heat is continued until reaction is completed and no further precipitate is formed, when the resulting insoluble product is removed by suitable means, and the dyestuff which I term "petracin A" and which is contained in the remaining solution, is precipitated therefrom by the addition of sodium chlorid, hydrochloric or other acid, or by any other convenient means.

Instead of removing the insoluble matter as above stated before heat is applied, the crude sulfoproducts may be added to the hypochlorite solution and agitated under application of heat until reaction and the separation of the insoluble and soluble products is completed. The soluble products may then be recovered by filtration or other means and the dyestuff precipitated therefrom.

The crude sulfoproducts employed in the process may vary greatly in composition according to their source, and consequently the proportion and strength of the hypochlorite solution must be more or less modified and adjusted to meet such variations.

Where clhorid of lime is used instead of sodium hypochlorite, it may be added to the solution of the sulfoproducts, and the insoluble lime may be removed from the solution before heat is applied.

The process may also be applied to the azo or nitroproducts derived from petroleum.

Instead of using the salt of a halogen oxid, the acid itself may be used. In this case I prefer to dissolve one hundred parts of the sulfonated product in one thousand parts of water, or approximately these proportions, add thereto one hundred parts or the requisite quantity of nitro-muriatic acid and subsequently neutralize with an alkali.

The product of this invention and which, as previously stated, I term petracin, is of a deep orange color, soluble in hot and cold water, glycerin or alcohol. Its solution is not affected by acids, alkali or chlorid of lime. Heated in acidulated solution it dyes, without mordant, wool or silk the color of old gold. From it a variety of other dyestuffs may be obtained.

What I claim is:—

1. In the process of producing dyestuffs from petroleum, exposing constituents thereof to reaction with inorganic acids and exposing the product to the action of an inorganic compound containing oxygen and a halogen.

2. In the process of producing dyestuff from products obtained in the treatment of petroleum substances with sulfuric acid, exposing said products to the action of an inorganic compound containing oxygen and a halogen.

3. In the process of producing dyestuff, exposing petroleum products such as the products obtained by treating petroleum substances with sulfuric acid to the action of an inorganic compound containing oxygen and chlorin.

4. In the process of producing dyestuff, exposing petroleum products such as the products obtained by treating petroleum substances with sulfuric acid to the action of an inorganic compound containing a halogen, oxygen and an alkali metal.

5. In the process of producing dyestuff, exposing petroleum products such as the products obtained by treating petroleum substances with sulfuric acid to the action of an inorganic compound containing chlorin, oxygen and an alkali metal.

6. In the process of producing dyestuff from the products obtained in the refining of petroleum by means of sulfuric acid, exposing such products to the action of sodium hypochlorite.

7. Process of producing dyestuff from products obtained by treating petroleum distillates with sulfuric acid, consisting in subjecting such products to the action of an inorganic compound containing oxygen and a halogen thereby obtaining soluble and insoluble products, removing the latter and precipitating the dyestuff from the remaining solution.

8. A new product of petroleum, being the product obtained from the solution which results from the reaction between an inorganic compound containing oxygen and a halogen and petroleum products, such as the sulfo products obtained by treating petroleum substances with sulfuric acid, said new product of petroleum being a dyestuff of yellow to brown color, soluble in hot and cold water, its solution being unaffected by diluted acids, alkali or sodium hypochlorite, and which when heated in acidulated solution will dye without mordant wool or silk a yellow color.

In testimony whereof I have hereunto set my hand this 22nd day of January A. D. 1917.

HANS A. FRASCH.

Witnesses:
E. A. MANNING,
W. C. JORDAN.